(12) United States Patent
Sogabe et al.

(10) Patent No.: US 6,502,776 B2
(45) Date of Patent: Jan. 7, 2003

(54) TAPE LEADER MEMBER IN A SINGLE-REEL TAPE CARTRIDGE

(75) Inventors: Teruo Sogabe, Takatsuki (JP); Nobutaka Miyazaki, Kustasu (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 09/870,627

(22) Filed: Jun. 1, 2001

(65) Prior Publication Data
US 2002/0017581 A1 Feb. 14, 2002

(30) Foreign Application Priority Data

Jun. 1, 2000 (JP) ........................................ 2000-165121
Jun. 1, 2000 (JP) ........................................ 2000-165122
May 17, 2001 (JP) ........................................ 2001-148410

(51) Int. Cl.[7] ............................................ G11B 23/107
(52) U.S. Cl. ................................. 242/332.4; 242/348.2
(58) Field of Search ............................ 242/332.4, 332.7, 242/348.2, 532.1, 532.7, 582, 338, 338.1

(56) References Cited

U.S. PATENT DOCUMENTS

| | | | | |
|---|---|---|---|---|
| 5,209,425 A | * | 5/1993 | Krabbenhoft et al. | 242/348.2 |
| 5,492,284 A | * | 2/1996 | Sorensen | 242/348.2 |
| 5,883,771 A | * | 3/1999 | Hoerger | 242/332.4 |
| 5,927,633 A | * | 7/1999 | McAllister | 242/332.4 |
| 5,971,310 A | * | 10/1999 | Saliba et al. | 242/332.4 |
| 6,050,514 A | * | 4/2000 | Mansbridge | 242/332.4 |
| 6,082,652 A | * | 7/2000 | Theobald | 242/332.4 |
| 6,092,754 A | * | 7/2000 | Rathweg et al. | 242/332.4 |

FOREIGN PATENT DOCUMENTS

JP 11232826 8/1999

* cited by examiner

*Primary Examiner*—William A. Rivera
(74) *Attorney, Agent, or Firm*—Birch, Stewart, Kolasch & Birch, LLP

(57) ABSTRACT

A single-reel tape cartridge cooperable with an operatively compatible tape drive including a tape catch member (50) includes a cartridge housing (1) having a tape window (4) defined therein and accommodating therein a single reel (2) with a roll of a length of magnetic recording tape (3) thereon. A leader member (13) includes a metallic leader pin (14) extending in a direction orthogonal to a lengthwise direction of the magnetic tape and first and second hooking arms (15). The leader pin has opposite ends thereof insert-molded into the first and second hooking arms (15) to thereby connect the leader pin with the first and second hooking arms (15) so as to represent a generally U-shaped configuration.

10 Claims, 5 Drawing Sheets

TAPE LEADER MEMBER IN A SINGLE-REEL TAPE CARTRIDGE

CROSS-REFERENCE TO THE RELATED APPLICATIONS

U.S. patent application Ser. No. 09/804042 filed Mar. 13, 2001 and assigned to the same assignee of the invention disclosed herein.

BACKGROUND OF THE INVENTION

1. Field of the Invention

The present invention generally relates to a single-reel recording tape cartridge and, more particularly, to the single-reel recording tape cartridge of a kind including a leader member which is, when in use, captured by a catch member, forming a part of an automatic tape threading mechanism built in the tape drive, so that a length of magnetic recording tape can be drawn out of the cartridge.

2. Description of the Prior Art

The tape cartridge of the kind referred to above is well known in the art and is disclosed in, for example, the Japanese Laid-open patent publication No. 11-232826, published Aug. 27, 1999. In general, the single-reel recording tape cartridge includes a generally rectangular cartridge housing having a reel chamber defined therein, and a single reel freely rotatably accommodated within the reel chamber and having a roll of a length of magnetic recording tape mounted thereon. The length of magnetic recording tape has one end anchored to a reel hub and the opposite, free end coupled with a leader piece. When the cartridge is in use, having been loaded into a tape drive for data recording or retrieval, a catch member forming a part of an automatic reeling mechanism built in the tape drive captures the leader piece to draw the magnetic recording tape out of the cartridge housing for data recording or retrieval in cooperation with a magnetic read/write head.

The leader piece disclosed in the publication No. 11-232826 is in the form of a metal pin of a uniform diameter over the length thereof and having its opposite ends formed with an engagement boss of a diameter greater than that of the metal pin. The leader piece disclosed in this publication is, when the cartridge is not in use, retained at a retracted position with its opposite engagement bosses receded within generally U-shaped bearing recesses defined in top and bottom panels of the cartridge. Barrier walls for preventing a spring element from being displaced in position are formed adjacent the associated bearing recesses so as to protrude parallel to the top and bottom panels, respectively. The spring element is in the form of a torsion spring having opposite spring arms, one of which is formed with a generally arcuate portion adapted to engage the corresponding engagement boss when the leader piece is held in the retracted position.

According to this publication, connection between the leader piece, that is, the metal pin and the free end of the magnetic recording tape is achieved by turning the free end of the magnetic recording tape around the metal pin to form a tape loop around the metal pin and mounting an elastic C-clip externally around the tape loop, with the intervention of a cushioning sleeve between the metal pin and the C-clip, to secure the free end of the magnetic recording tape to the metal pin. The metal pin has upper and lower, thin-walled annular flanges formed integrally therewith so as to protrude radially outwardly therefrom and positioned on respective sides of the tape loop, or the C-clip connecting it to the metal pin.

This publication describes the annular flanges as "flange-like thin-walled dividing walls" and is silent as to the function thereof, but a portion of the metal pin between the annular flanges is shown as being used to receive the free end of the magnetic recording tape that is turned and secured in position by the C-clip.

In any event, the single-reel recording tape cartridge in general makes use of a leader piece to ensure a sure withdrawal of the length of magnetic recording tape out of the cartridge housing in cooperation with the catch member. In order for the leader piece to be assuredly drawn of the cartridge housing by the action of the catch member, the leader piece must be retained in the retracted position without being axially displaced and, also, without being tilted when the magnetic recording tape is not in use. In addition, the leader piece held at the retracted position should not displace from the retracted position in any way whatsoever even when external impacts or shocks are applied thereto as a result of, for example, the tape cartridge having been inadvertently dropped onto a floor.

Considering the severe requirement that the leader piece must be retained precisely in proper posture when the tape cartridge is not in use, connection of the tape free end with the metal pin by means of the C-clip creates a high possibility that the tape free end may be connected with the metal pin with its longitudinal axis departing from an orthogonal relation with the metal pin. An additional problem is found in that since the engagement bosses formed integrally with opposite ends of the metal pin are received within generally U-shaped bearing recesses defined in top and bottom panels of the cartridge, one or both of the torsional springs may be dislocated in the event of an inadvertent dropping of the tape cartridge onto, for example, the floor. Once this occurs, the metal pin is, of course, dislodged from the retracted position.

SUMMARY OF THE INVENTION

In an attempt to alleviate the problems and inconveniences discussed above, the inventors of the present invention have found that they can be successfully alleviated if the leader member is so structured and configured as to represent a generally U-shaped configuration including a pair of hooking arms and a leader pin having opposite ends connected respectively with the hooking arms. A series of experiments conducted by the inventors have shown that the U-shaped leader member is effective to withstand an external impact or shock and will not therefore be skewed or deformed even when the external impact of shock acts thereon.

More specifically, in order to accomplish the foregoing objective, the present invention provides a single-reel tape cartridge cooperable with an operatively compatible tape drive including a tape catch member, which tape cartridge includes a cartridge housing having a tape window defined therein; a single reel rotatably accommodated within the cartridge housing and having a roll of a length of magnetic recording tape coaxially mounted thereon; a length of leader tape having first and second ends, the first end of the leader tape being connected with a free end of the magnetic recording tape; and a leader member connected with the second end of the leader tape and positioned adjacent the tape window for engagement with the tape catch member when the length of magnetic tape is to be drawn out of the cartridge housing and into the tape drive. The leader member includes a metallic leader pin extending in a direction orthogonal to a lengthwise direction of the magnetic tape and first and second hooking arms and having opposite ends thereof insert-molded into the first and second hooking arms to thereby connect the leader pin with the first and second hooking arms so as to represent a generally U-shaped configuration.

Each of the opposite ends of the leader pin may be formed with a respective anchor which, when insert-molded into the corresponding hooking arm, prevents a rotation of the leader pin relative to such corresponding hooking arm and also separation of such corresponding hooking arm from the leader pin. Preferably, the leader pin has a round sectional shape and each of the opposite ends of the leader pin is flattened to define the anchor of a shape flaring outwardly from the leader pin.

According to the present invention, connection of the leader pin with the hooking arms by the use of an insert-molding technique is particularly advantageous in that not only can the leader pin be accurately positioned relative to the hooking arms at right angles thereto, but also the spacing and parallelism between the hooking arms can be secured with high precision. By way of example, as compared with the leader member wherein after the hooking arms have been molded, the leader pin is connected with the hooking arms with its opposite ends press-fitted into the respective hooking arms, connection of the leader pin with the hooking arms by the use of the insert-molding technique is effective to eliminate variation in final shape of the resultant leader member. Moreover, since the leader pin and the hooking arms can be integrated together during a molding process used to form the hooking arms, no extra process to connect the leader pin with the hooking arms is required, making it possible to provide the leader member at a reduced manufacturing cost.

As compared with the case in which the leader member is constituted solely by a leader pin, the leader member of the U-shaped configuration is so difficult to tilt that the leader pin can be correctly positioned and, consequently, the leader member of the U-shaped configuration can easily be held in a correct posture within the cartridge housing. Accordingly, a tape drawing operation performed by the catch member on the part of the tape drive can be repeatedly performed substantially in a trouble-free manner for a prolonged period of time.

Particularly where the leader pin has an anchor formed on each of the opposite ends thereof, a rotation of the leader pin relative to the hooking arms and, also, a separation of one or both of the hooking arms from the leader pin can be effectively avoided and, accordingly, the leader member can have a robust structure.

In one preferred embodiment of the present invention, each of the first and second hooking arms may have an entry guide face defined therein so as to face in a direction away from the magnetic tape and also has a hooking groove defined in a free end portion of the respective hooking arm so as to extend in a direction generally lengthwise of the corresponding hooking arm while opening laterally towards the leader pin by way of the entry guide face and also towards the other hooking arm.

In another preferred embodiment of the present invention, a releasable lock mechanism may be employed in the single-reel tape cartridge for holding the leader member firmly in a retracted position inside the cartridge housing when the tape cartridge is not in use. In this case, the releasable lock mechanism may include a pair of first lock members and a second lock member cooperable with each other to lock the leader member at the retracted position at which the leader member is housed within the cartridge housing and positioned adjacent the tape window, and a spring element for urging the second lock member towards a locking position. The first lock members may be formed in top and bottom panels of the cartridge housing adjacent the tape window for receiving the leader member at the retracted position in a predetermined posture whereas the second lock member may be positioned in a predetermined posture whereas the second lock member may be positioned within the cartridge housing adjacent the tape window and comprises an elongated lock body reciprocatingly displaceably supported by the cartridge housing for movement between locking and release positions. A biasing spring may be housed within the cartridge housing for urging the elongated lock body towards the locking position so that the second lock member can cooperate with the first lock members to lock the leader member at the retracted position.

Also, according to the present invention, the leader tape is connected with the leader pin in any of methods in a manner effective to avoid a departure of the leader tape from the orthogonal relationship with the leader pin and also to distribute a pulling force, acting on the leader tape, towards one or both of opposite side edges of the leader tape. For this purpose, the leader pin preferably has at least one radial step formed therein for avoiding a displacement of the leader tape relative to the leader pin in a direction axially thereof so that the second end of the magnetic tape can be looped around the leader pin with at least one of opposite side edges of the leader tape held in abutment with the radial step to thereby position the leader tape with respect to the direction axially of the leader pin.

Alternatively, the leader pin may have a large or reduced diameter portion defined at a location axially intermediate of a length of the leader pin. In this case, the second end of the leader tape has to have a cutout defined therein so as to extend inwardly thereof in order to leave two tape end segments that are looped around end portions of the leader pin on respective sides of the intermediate portion thereof with one of opposite side edges of each of the tape end segments held in abutment with the adjacent radial step.

In any event, the radial step preferably has a size equal to or greater than half the thickness of the leader tape. Also, the leader tape is preferably made of a hard tape having some elasticity in order to avoid a possible deformation of one or both of the opposite side edges of the leader tape to thereby avoid a possible displacement in position of the leader tape in a direction axially of the leader pin.

BRIEF DESCRIPTION OF THE DRAWINGS

The present invention will become readily understood from the following description of preferred embodiments thereof made with reference to the accompanying drawings, in which like parts are designated by like reference numeral and in which.

DESCRIPTION OF THE PREFERRED EMBODIMENTS

Figure 1:
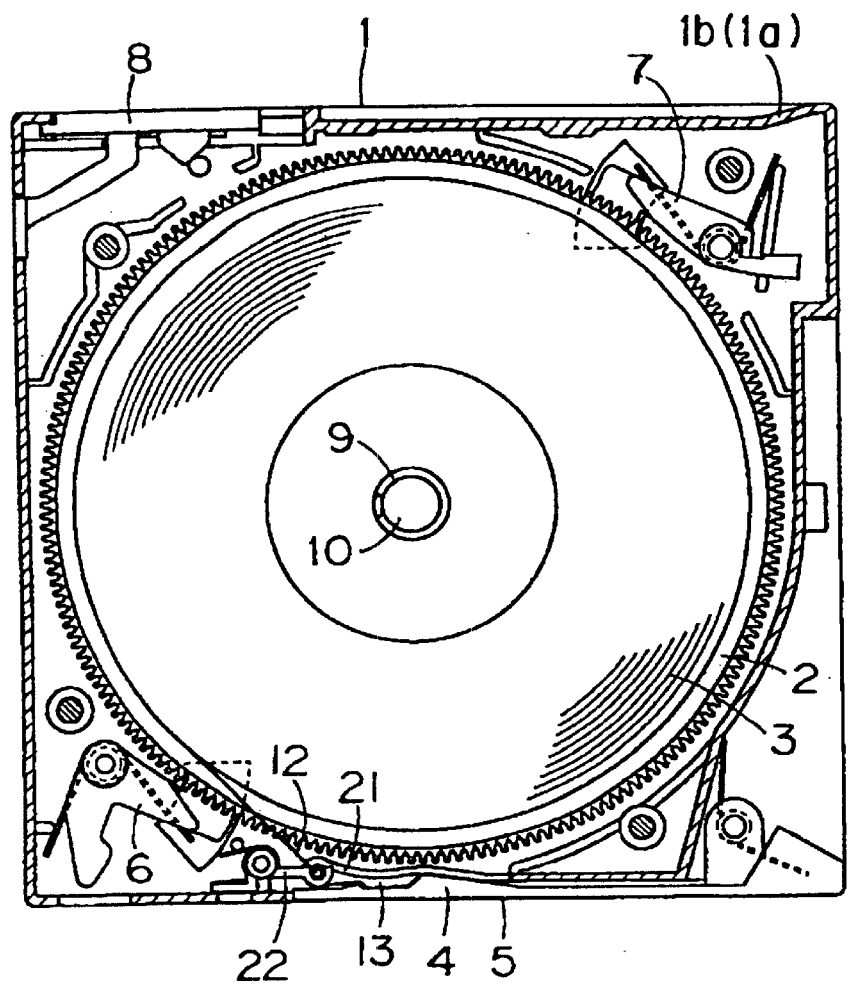
FIG. 1 is a top plan view of a single-reel tape cartridge according to the present invention, with a top casing half removed to show component parts inside the tape cartridge.

Referring first to FIG. 1, a tape cartridge includes a housing 1 of a generally rectangular configuration made up of top and bottom housing halves 1a and 1b although in FIG. 1 the top housing half 1a is removed and therefore not shown. The cartridge housing 1 may be of any known construction and does, accordingly, suffice it to say that when the top and bottom housing halves 1a and 1b are assembled together, the cartridge housing 1 has a reel chamber defined therein and delimited by top and bottom panels and four peripheral walls lying perpendicular to any one of the top and bottom panels and including front, rear and side wall segments. This cartridge housing 1 also includes an erasure preventive switching piece 8 slidably supported by the rear wall of the cartridge housing 1 for movement between a write enable position and a write disable position in any known manner. The front wall of the cartridge housing 1 opposite to the rear wall thereof is formed with a tape window 4 adapted to be selectively opened or closed by a generally elongated pivotable door 5 that is normally biased towards a closed position by a spring element, for example, a torsional spring to close the tape window 4 and is locked at the closed position by any suitable releasable door lock mechanism (not shown).

A single reel 2 is freely rotatably accommodated within the reel chamber and includes a reel hub and at least one radial flange which may be formed integrally with one end of the reel hub, preferably a lower end of the reel hub adjacent the bottom panel of the reel housing 2, so as to extend radially outwardly therefrom. The radial flange has an outer peripheral edge formed with a series of gear teeth. Reel locking pawls 6 and 7 selectively engageable with the gear teeth of the radial flange to hold the single reel 2 in a stationary position when the reel cartridge is not in use are operatively accommodated within the reel chamber at respective locations adjacent diagonally opposite corner areas of the cartridge housing 1. It is to be noted that the reel locking pawls 6 and 7 are normally biased by respective spring elements, for example, torsional springs, towards the gear teeth of the radial flange in a manner well known to those skilled in the art.

With the single reel 2 held in position within the reel chamber in the manner described above, a length of magnetic recording tape 3 having one end anchored to the reel hub is spirally wound around the reel hub. Also, a biasing spring, for example, a coiled spring 9 is interposed between the reel hub and the top panel of the cartridge housing 1 to urge the reel 2 downwardly towards the bottom panel of the cartridge housing 1, to thereby minimize an undesirable rattling motion of the single reel 2 which would otherwise occur within the reel chamber in a direction axially of the reel hub. If desired, a freely rotatable steel ball 10 may intervene between the coil spring 9 and the reel hub to facilitate a smooth rotation of the single reel 2 about its own longitudinal axis.

When the cartridge is in use having been loaded into a tape drive for data recording or retrieval, a catch member forming a part of an automatic reeling mechanism built In the tape drive captures the leader member to draw the magnetic recording tape out of the cartridge housing 1 through the tape window 4 in readiness for data recording or retrieval in cooperation with a magnetic read/write head (not shown) as hereinbefore described. This can be accomplished by the following manner which will now be described with particular reference to FIGS. 1 to 6.

Referring now to FIGS. 1 to 6, in order for the length of magnetic tape 3 to be captured and pulled by the catch member 50 outwardly from the cartridge housing 1, the leader member generally identified by 13 is secured to a leader tape 12 which may be either a part of the free end of the magnetic tape 3 or a separate member welded to the free end of the magnetic tape 3. The leader tape 12 continued from the magnetic tape 3 may be prepared from a sheet of a hard plastic material having an elasticity such as, for example, polyethylene terephthalate or polybutylene terephthalate. The catch member 50 cooperable with the leader member 13 referred to above forms a part of any known automatic tape threading mechanism built in the tape drive (not shown) and includes a catch pin 19 having its opposite ends formed with respective balls 19a and 19b. This catch pin 19 is normally retracted within the tape drive and is, when the tape cartridge is ready to be used for data recording or retrieval, guided by a loading arm (not shown, but also forming another part of the tape drive) so as to grab the leader member 13. Accordingly, when the automatic reeling mechanism in the tape drive is activated, the catcher member H being pulled by the automatic reeling mechanism withdraws the length of magnetic tape 2 outwardly from the cartridge housing 1 with the catch pin 17 capturing the leader member 13 in a manner as will be described later with reference to FIGS. 5 and 6.

As best shown in FIGS. 2A to 3B, a free end of the leader tape 12 remote from the magnetic tape 3 has a cutout 31 defined therein at a location intermediate of the width of the leader tape 12 so as to extend a distance inwardly therefrom with respect to the lengthwise direction of the leader tape 2, thereby leaving upper and lower tape end segments 12a. The upper and lower tape end segments 12a of the leader tape 2 are turned around the leader member 14 so as to extend backwards and are welded or bonded to a portion of the leader tape 12 inwardly of the cutout 31 to thereby connect the leader pin 14 to the leader tape 12. Thus, the upper and lower tape end segments 12a turned around the leader member 14 form respective loops so loosely around the leader member 14 that the leader member 14 can be freely rotatable relative to the leader tape 12 within the loops.

Referring still to FIGS. 2A to 3B, the leader member 13 employed in the illustrated embodiment is of a generally U-shaped configuration including a metallic leader pin 14 preferably made of stainless steel, and a hooking arm 15 fixedly mounted on each of opposite ends of the leader pin 14 so as to protrude in a direction generally perpendicular to the leader pin 14. The leader pin 14 is formed with a large diameter portion 14a positioned intermediate of the length of the leader pin 14 while leaving end portions 14b of a diameter slightly smaller than the large diameter portion 14a on respective sides of the large diameter portion 14a. Specifically as best shown in FIG. 2B showing a portion of the leader pin 14 that is shown as enclosed by the circle in FIG. 2A, the relationship in diameter between the intermediate portion 14a and each of the end portions 14b is such that a radial step 30 defined therebetween in the presence of the difference in diameter has a size D is chosen to be of a value equal to or greater than half the thickness T of the leader tape 12 and, preferably equal to or greater than the sum of half the thickness T of the leader tape 12 and the gap size between each tape end segments 12a and 12b and the corresponding end portion 14b of the leader pin 14.

The tape end segments 12a of the leader tape 12 that are connected to the leader pin 14 is in practice turned around the respective end portions 14b of the leader pin 14 with the large diameter portion 14a of the leader pin 14 positioned within the cutout 31 and, thus, between the tape end segments 12a. Since the opposite end portions 14b of the leader pin 14 have a diameter smaller than that of the intermediate portion 14a thereof, the radial step 30 referred to previously is formed on respective sides of the intermediate portion 14a. Accordingly, when the tape end segments 12a are looped around the respective end portions 14b of the leader pin 14 in the manner described hereinbefore, lower and upper side edges of the respective tape end segments 12a are substantially held in engagement with the corresponding steps 30, wherefore not only can the leader tape 12 can be accurately positioned relative to the leader pin 14, but any possible displacement of the leader tape 12 in a direction axially of the leader pin 14 can be avoided.

The details each of the hooking arms 15 mounted on the opposite ends of the leader pin 14 will now be described. The upper and lower hooking arms 15 are of a substantially identical construction and are symmetrically positioned on the respective ends of the leader pin 14 with respect a point intermediate of the length of the leader pin 14. Each of the hooking arms 15 having a longitudinal axis lying generally perpendicular to the leader pin 14 is substantially curved to follow the curvature of the roll of the magnetic tape 3 on the single reel 2. Each hooking arm 15 has inner and outer side faces opposite to each other, the inner side face facing the roll of magnetic tape 3 when and so long as the leader member 13 is held in the retracted position within the cartridge housing 1 as shown in FIGS. 1 and 2.

As best shown in FIGS. 2A to 4, the outer side face of each of the hooking arms 15 opposite to the roll of the magnetic tape 3 defines an entry guide face 17 leading to a hooking groove 16 for receiving a corresponding end of the catch pin 19 of the catch member 50 in a manner as will become clear from the subsequent description. The hooking groove 16 is defined in a free end portion of the respective hooking arm 15 so as to extend in a direction generally lengthwise of the corresponding hooking arm 15 while opening, as at 18, laterally towards the leader pin 14 by way of the adjacent entry guide face 17 and also towards the other hooking arm 15. The hooking groove 16 so defined has one end terminating within the corresponding hooking arm 15 at a location inwardly of the free end thereof remote from the leader pin 14 and the opposite end thereof defining a groove inlet 18. Thus, it will readily be understood that the hooking grooves 16 in the upper and lower hooking arms 15 open downwardly and upwardly, respectively, so as to confront with each other so that the opposite ends of the catch pin 17 can be received within those hooking grooves 16 through the groove entries 18. Thus, the free end portion of the upper hooking arm 15 where the hooking groove 16 is defined has a top wall opposite to the downward opening of the hooking groove 16 confronting the lower hooking arm 15, whereas the free end portion of the lower hooking arm 15 where the hooking groove 16 is defined has a bottom wall opposite to the upwardly opening of the hooking groove 16 confronting the upper hooking arm 15.

It is to be noted that the upper and lower hooking arms 15 are spaced from each other a distance sufficiently larger than the width of the leader tape 12 and, hence, the magnetic tape 3 to avoid any possible interference of stationary lock members 21 as will be described later with the path of movement of the magnetic tape 3. It is also to be noted that the presence of the top wall in the upper hooking arm 15 and the bottom wall in the lower hooking arm 15 is effective to avoid any possible axial displacement of the catch pin 19 when and so long as the catch pin 19 is caught by the hooking arms 15 with the balls 19a integral with the opposite ends thereof engaged in the respective hooking grooves 19.

Each of the hooking arms 15 is made of a plastic material, and the leader pin 14 has its opposite ends insert-molded together with the hooking arms 15 during molding of the hooking arms 15. More specifically, while the leader pin 14 is rotatable relative to the loops of the upper and lower tape end segments 12a, the opposite ends of the leader pin 14 are interlocked with the associated hooking arms 15 to avoid any possible rotation thereof relative to the hooking arms 15 and, also, to avoid any possible separation of any one of the hooking arms 16 from the leader pin 14. For this purpose, the opposite ends of the leader pin 14 are integrally formed with respective anchors 14c that are insert-molded into the adjacent hooking arms 15. Each of the anchors 14c can easily be made by, for example, hammering, or otherwise flattening in any way, the end of the leader pin 14 to represent a shape generally flaring outwardly from the leader pin 14 as clearly shown in FIGS. 2A, 3A, 3B and 4. It is however to be noted that the shape of each anchor 14c may not be limited to that shown, but may be of any other suitable shape provided that the leader pin 14 will not rotate relative to any of the upper and lower hooking arms 15.

Figure 4:
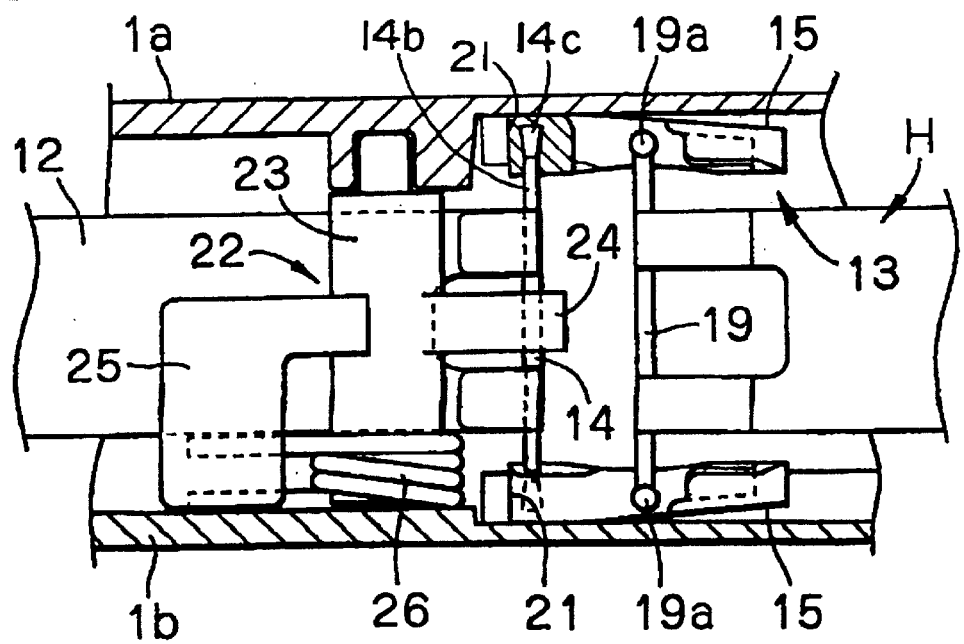
FIG. 4 is a fragmentary sectional view, on an enlarged scale, of a front portion of the single-reel tape cartridge of FIG. 1, showing a leader member held at a retracted position.
Figure 2A:
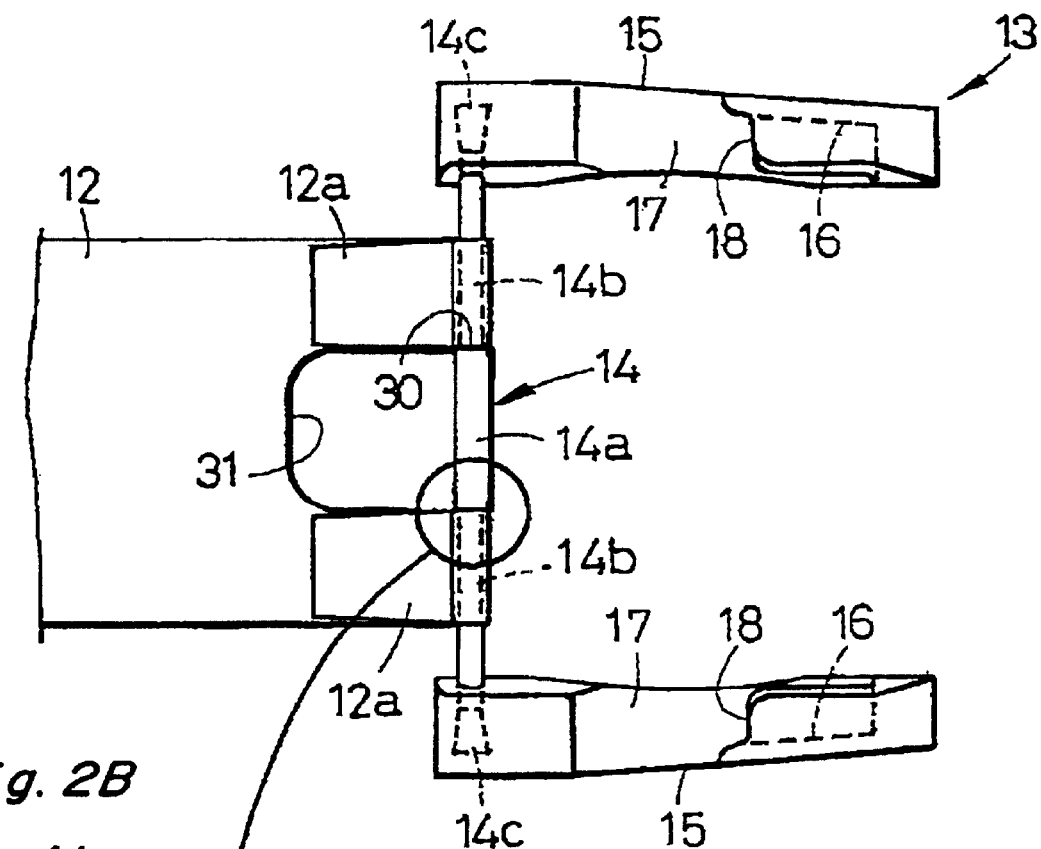
FIG. 2A is a fragmentary front elevational view showing a manner in which a leading end of a magnetic tape is anchored to the leader member.
Figure 2B:
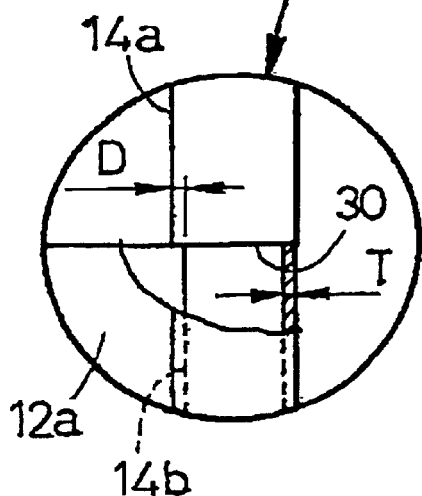
FIG. 2B is a fragmentary elevational view showing, on an enlarged scale, the detail of a portion of the leader member that is enclosed by the circle shown in FIG. 2A.
Figure 3A:
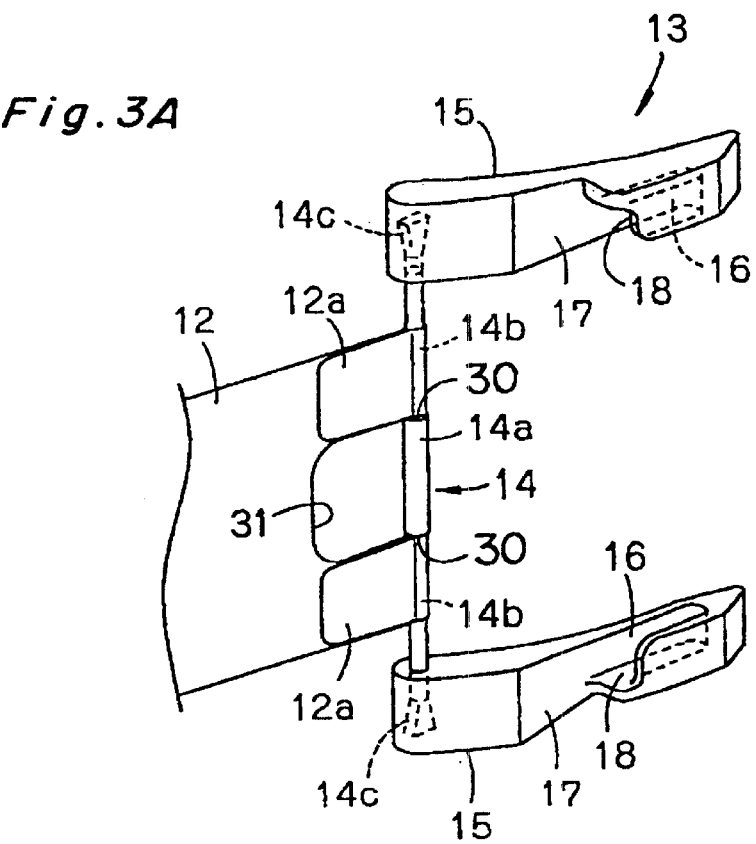
FIG. 3A is a perspective view of the leader member shown in FIG. 2A.
Figure 3B:
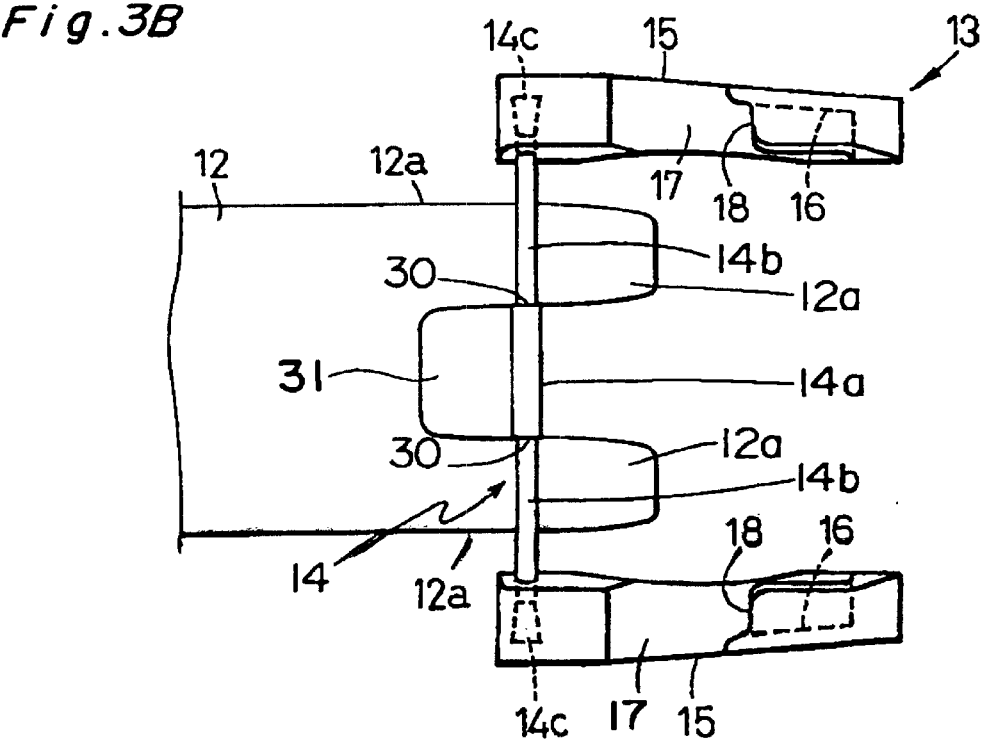
FIG. 3B is a front elevational view of the leader member shown in FIG. 3A, with the leading end of the magnetic tape shown as released from the leader member to show the details of the leader member.
Figure 5:
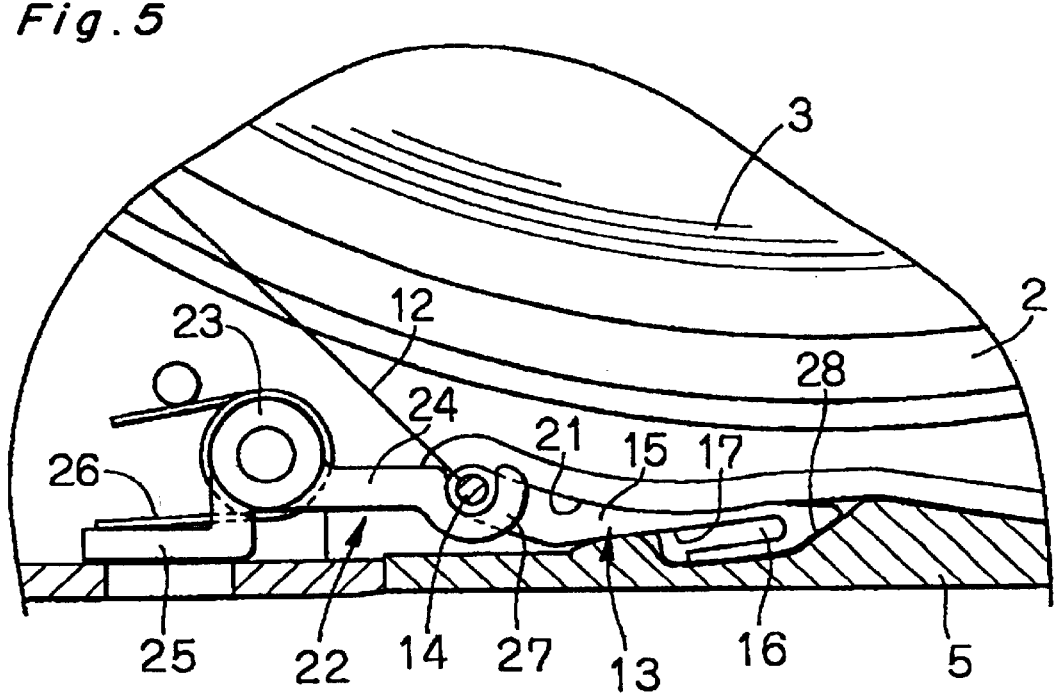
FIG. 5 is a fragmentary top plan view, on an enlarged scale, of the front portion of the tape cartridge, showing the leader member held at the retracted position.

When the tape cartridge is not in use, it is necessary that the leader member 13 then held at the retracted position can be locked in such position by means of a releasable locking mechanism. The releasable locking mechanism referred to above includes generally elongated upper and lower stationary seat members 21 formed integrally with top and bottom panels of the cartridge housing 1 so as to confront the tape window 4 as best shown in FIGS. 4 and 5. More specifically, each of the upper and lower stationary seat members 21 may be in the form of an elongated rib that is integrally molded with the top or bottom panel of the cartridge housing 1 so as to follow the contour of the inner side face of the adjacent hooking arm 15 as best shown in FIG. 2. Each stationary seat member 21 has one end 21 a so formed and so shaped as to be recessed inwardly of the cartridge housing 1 to thereby provide an arcuate seat in which one end of the associated hooking arm 15 adjacent the leader pin 14 can be received snugly when the leader member 13 is in the retracted position.

The locking mechanism of the above described structure may sufficiently work well. However, in the illustrated embodiment, in order to ensure that even when the magnetic tape 3 wound around the reel hub is slackened, the leader member 13 held in the retracted position will not displace in any direction in the event of application of an external impact to the tape cartridge which would occur when the tape cartridge is inadvertently fallen onto, for example, the floor, the locking mechanism also includes a generally elongated movable lock member 22 cooperable with the arcuate seats in the upper and lower stationary seat members 21 to hold the leader pin 14 in position steadily as will be described later. This movable lock member 22 is made of plastic and is of one piece construction including an elongated lock body 24 having one end formed with a release piece 25 and the other end formed with a hook 27. A portion of the lock body 22 generally intermediate of the length thereof is formed with a bearing boss 23 having its opposite ends journalled respectively to the top and bottom panels of the cartridge housing 1 so that the hook 27 can move angularly between locking and release positions about a longitudinal axis of the bearing boss 23. This movable lock member 22 is normally biased counterclockwise, as viewed in FIGS. 1 and 5 by a biasing spring with the hook 27 moved angularly to the locking position as best shown in FIG. 5. This biasing spring may be a torsional spring 26 loosely mounted on a lower end of the bearing boss 23, as shown in FIG. 4, with its opposite ends engaged respectively to the release piece 25 and a stop pin integral with the bottom panel of the cartridge housing 1 as shown in FIG. 2.

The releasable locking mechanism of the structure described above is so designed and so configured that so long as the tape cartridge is not in use with the leader member 13 held at the retracted position, the respective ends of the upper and lower hooking arms 15 can be received in the corresponding upper and lower stationary seat members 21 while the hook 27 of the movable lock member 22 then biased to the locking position receives therein an intermediate portion of the leader pin 14 that is situated between the upper and lower tape end segments 12a and 12b and that is exposed from the leader tape 12 through the cutout C. Since the biasing force of the torsional spring 26 is transmitted to the leader pin 14 through the movable lock member 22 by way of the hook 27, the leader member 13 can be locked in position at the retracted position with the leader pin 14 grabbed generally in a shakehand fashion between the seat members 21 and the hook 27.

Figure 6:
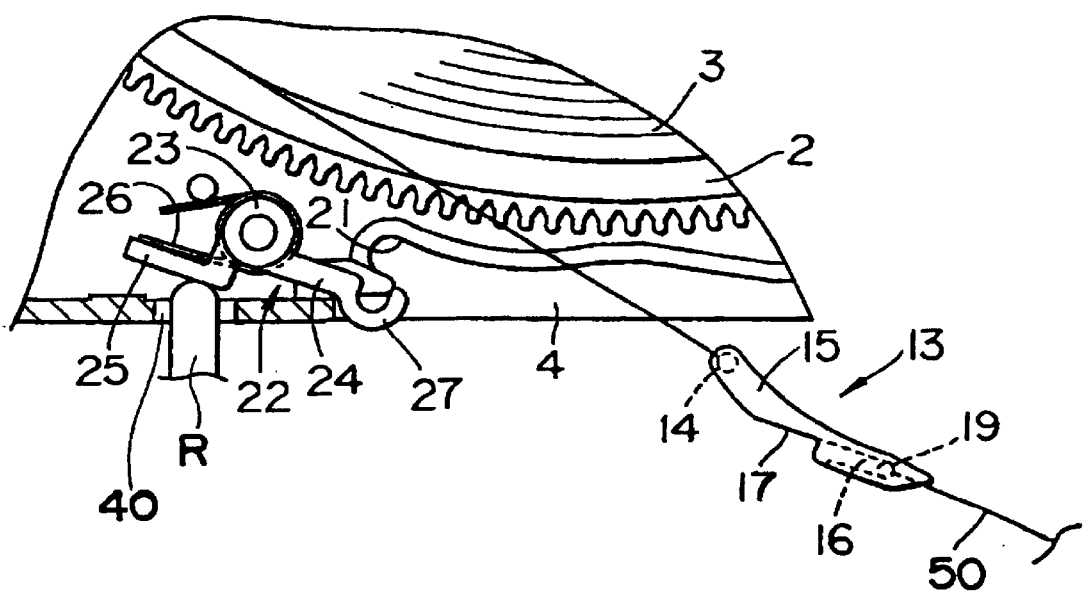
FIG. 6 is a fragmentary top plan view of the front portion of the tape cartridge, showing the leader member drawn out of a cartridge housing by the action of a catch member.

However, when the tape cartridge of the present invention is loaded into the tape drive, a release pin R provided in the tape drive protrudes into the cartridge housing 1 through an opening 40 defined in a front side wall segment of the cartridge housing 1 adjacent the tape window 4 and is brought into engagement with the release piece 25 to cause the movable lock member 22 to be moved clockwise about the longitudinal axis of the bearing boss 21 against the torsional spring 26. Once this occurs, the hook 27 is moved towards the release position as shown in FIG. 6, allowing the leader pin 14 ready to be pulled out of the cartridge housing 1. It is to be noted that the opening 40 in the front side wall segment of the cartridge housing 1 is normally closed by the release piece 25 so long as the movable lock member 22 is biased counterclockwise by the torsion spring 26.

Thus, it will readily be seen that even though the magnetic tape 3 wound around the reel hub is loosened with the reel locking pawls 6 and 7 momentarily disengaged from the gear teeth of the reel flange as a result of, for example, drop of the tape cartridge onto a floor, the leader member 13 can be retained in position locked by the releasable locking mechanism. As is well known to those skilled in the art, when an external impact is applied to the tape cartridge such as occurring when the tape cartridge is inadvertently fallen onto the floor, not only can the reel locking pawls 6 and 7 be momentarily disengaged from the gear teeth of the reel flange, but the leader pin 14 may also be quivered. However, in the present invention, the quivering motion of the leader pin 14 can advantageously be absorbed by the movable lock member 22 then instantaneously pivoting about the bearing boss 21 against the torsional spring 26. Accordingly, the releasable locking mechanism is effective to lock the leader member 13 at the retracted position firmly without allowing the leader pin 14 to depart from the right position, even though the length of magnetic tape 3 is loosened.

As hereinbefore described, when the tape cartridge is not in used, the tape window 4 is closed by the pivotable door 5. At this time, the leader member 13 then held at the retracted position is also covered by the pivotable door 5 and is therefore invisible from the outside of the tape cartridge. This pivotable door 5 has an inner surface formed with a retainer region 28 that is so contoured as to follow the shape of the outer surface of each of the hooking arms 15 such that when the door 5 is in the closed position with the leader member 13 held at the retracted position, the hooking arms 15 can be retained in position sandwiched snugly between the stationary seat members 21 and the pivotable door 5. Thus, not only can the leader pin 14 be firmly grabbed by the releasable locking mechanism, but the hooking arms 15 can also be retained firmly in position sandwiched snugly between the stationary seat members 21 and the pivotable door 5 without allowing the hooking arms 15 to undergo an arbitrary motion, and therefore, the leader member 13 can advantageously be held stationary and substantially immovable so long as the tape cartridge is not in use.

From the foregoing description, it will readily be seen that when the tape cartridge embodying the present invention is in use having loaded into the tape drive, the pivotable door 5 is opened as shown in FIG. 6 with the tape window 4 consequently exposed to the outside. Simultaneously with the loading of the tape cartridge into the tape drive, not only are the reel locking pawls 6 and 7 disengaged from the gear teeth of the reel flange to allow the reel 2 to be rotatable freely, but the movable lock member 22 is pivoted counterclockwise against the torsion spring 26 by the action of the release pin R then pushing the release piece 25. Counterclockwise pivot of the movable lock member 22 results in the hook 27 being angularly moved to the release position to disengage from the leader pin 14.

The tape reel 2 is drivingly coupled with a drive spindle in the tape drive through an access opening (not shown) defined in the bottom panel of the cartridge housing 1 and, thereafter, the catch member 50 in the tape drive is guided by the loading arm (not shown) of the tape drive into the tape window 4 until the opposite ends of the catch pin 17 are engaged deep into the hooking grooves 16 through the groove entries 18. Subsequent withdrawal of the catch member 50 into the tape drive results in pulling of the leader member 13 outwardly from the retracted position as shown in FIG. 6 with the length of magnetic tape 3 consequently withdrawn from the reel 2 and taken up by the automatic reeling mechanism in the tape drive for data recording or retrieval on or from the length of magnetic tape 3 by means of any known write/read head (not shown), respectively.

After the data recording or retrieval, the length of magnetic tape 3 is rewound around the reel 2 and the leader member 13 is returned to the retracted position in which the opposite ends of the leader pin 14 are received in the respective seat members 21, and is then locked thereat by the releasable locking mechanism with the hook 27 moved angularly to the locking position as best shown in FIG. 5.

Second Embodiment (FIG. 6)

Figure 7:
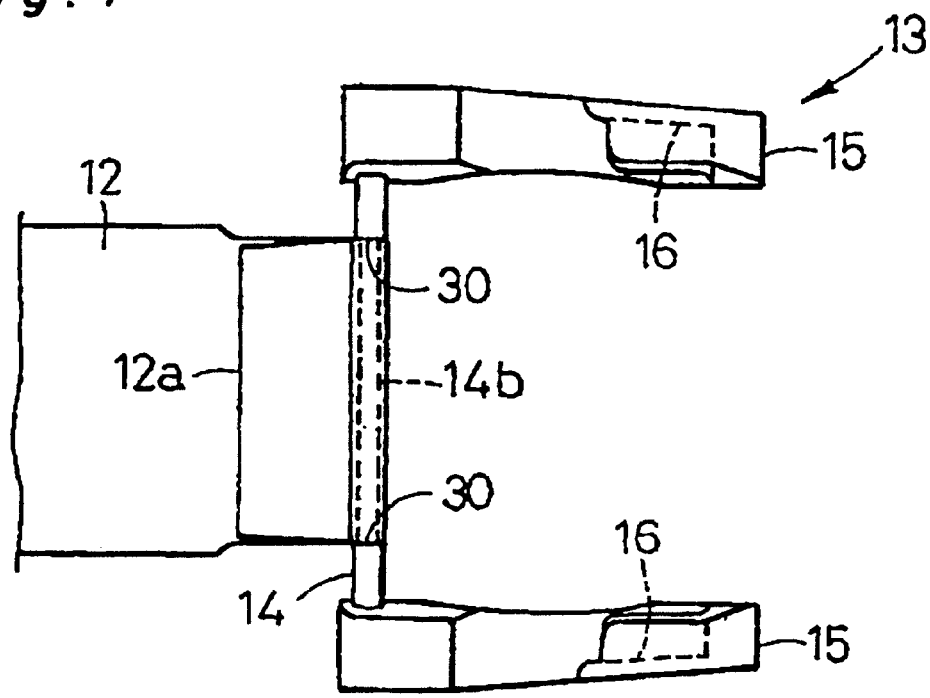
FIG. 7 is a front elevational view, showing a different connection between the leading end of the magnetic tape and the leader member according to a second preferred embodiment of the present invention.

The second embodiment of the present invention differs from the previously described first embodiment as to the manner in which the leader tape 12 is connected with the leader pin 14. As shown in FIG. 7, the leader pin 14 has an intermediate portion 14b having a diameter slightly reduced as compared with the diameter of each of the opposite end portions thereof with a step 30 defined in a transit region between the reduced diameter portion 14b and each of the opposite end portions of the leader pin 14. The free end portion 12a of the leader tape 12 which has no cutout such as shown by 31 in the foregoing embodiment is turned around the reduced diameter portion 14b of the leader pin 14. So far shown in FIG. 7, the free end portion 12a of the leader tape 12 has a width reduced from that of the remaining portion of the leader tape 12, however the free end portion 12a may have the same width as that of the remaining portion of the leader tape 12.

Figure 8:
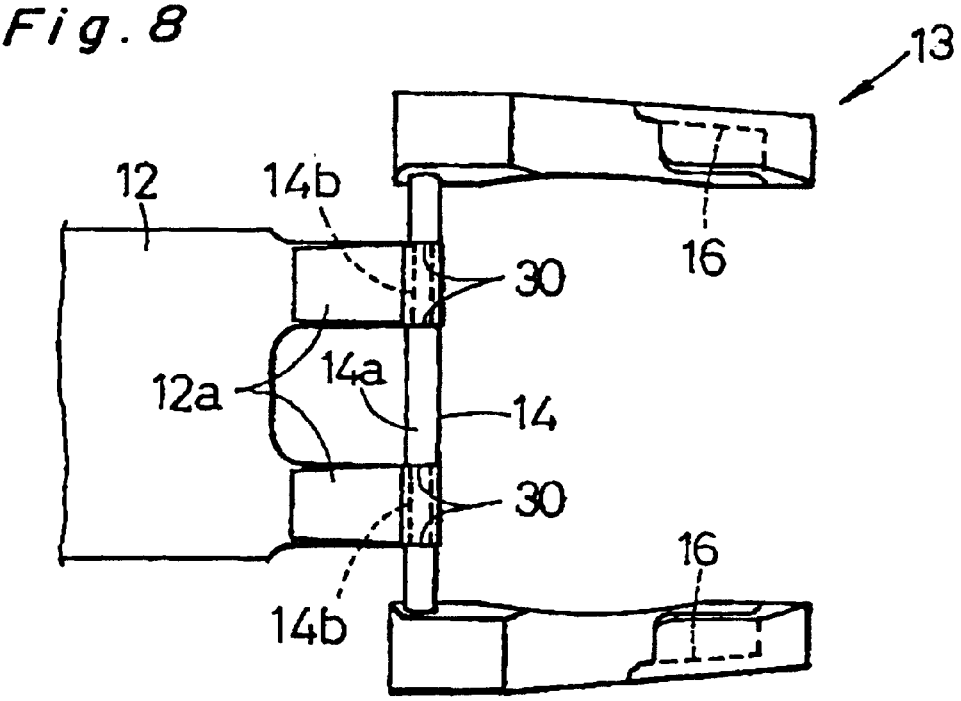
FIG. 8 is a view similar to FIG. 7, showing a further different connection between the leading end of the magnetic tape and the leader member according to a third preferred embodiment of the present invention.

Third Embodiment (FIG. 8)

As is the case with the second embodiment shown in FIG. 7, the third embodiment of the present invention also differs from the previously described first embodiment as to the manner in which the leader tape 12 is connected with the leader pin 14. As shown in FIG. 8, the leader pin 14 shown in FIG. 7 is of a structure substantially reverse to that best shown in FIGS. 2A to 3B. In other words, respective portions of the leader pin 14 around which the upper and lower tape segments 12a are looped have a diameter slightly smaller than the diameter of the remaining portion of the leader pin 14 with the step 30 defined on respective sides of each of the upper and lower tape segments 12a.

Although the present invention has been described in connection with the preferred embodiments thereof with reference to the accompanying drawings, it is to be noted that various changes and modifications are apparent to those skilled in the art. For example, in the embodiment shown in FIG. 8, the intermediate portion 14a of the leader pin 14 may have a diameter equal to that of any of that portions of the leader pin 14 around which the upper and lower tape segments 12a are looped. In other words, the leader pin having only an intermediate portion reduced in diameter as compared with that of each of the opposite end portions of the leader pin 14 may be employed for the embodiment shown in FIG. 8.

Also, in the embodiment shown in FIG. 7, although the two steps 30 are employed and shown, only one step may be sufficient. In other words, the leader pin 17 that can be employed in the practice of the embodiment shown in FIG. 7 may be of a structure in which only the upper or lower end of the loader pin 14 has a diameter slightly greater than that of the remaining portion of the leader pin 14.

In any event, the presence of the step or steps in the leader pin 14 in any one of the foregoing embodiments of the present invention is effective to avoid an undesirable axial displacement of the leader tape 12 relative to the leader pin 14.

Accordingly, such changes and modifications are to be understood as included within the scope of the present invention as defined by the appended claims, unless they depart therefrom.

What is claimed is:

1. A single-reel tape cartridge cooperable with an operatively compatible tape drive including a tape catch member, said tape cartridge comprising:

a cartridge housing having a tape window defined therein;

a single reel rotatably accommodated within the cartridge housing and having a roll of a length of magnetic recording tape coaxially mounted thereon;

a length of leader tape having first and second ends, the first end of the leader tape being connected with a free end of the magnetic recording tape; and a leader member connected with the second end of the leader tape and positioned adjacent the tape window, said leader member being engageable with the tape catch member when the length of magnetic tape is to be drawn out of the cartridge housing and into the tape drive;

wherein said leader member comprises a metallic leader pin extending in a direction orthogonal to a lengthwise direction of the magnetic tape and first and second hooking arms, said leader pin having opposite ends thereof insert-molded into the first and second hooking arms to thereby connect the leader pin with the first and second hooking arms so as to represent a generally U-shaped configuration.

2. The single-reel tape cartridge as claimed in claim 1, wherein each of the opposite ends of the leader pin is formed with a respective anchor which, when insert-molded into the corresponding hooking arm, prevents a rotation of the leader pin relative to such corresponding hooking arm and also a separation of such corresponding hooking arm from the leader pin.

3. The single-reel tape cartridge as claimed in claim 2, wherein the leader pin has a round sectional shape and each of the opposite ends of the leader pin is flattened to define the anchor of a shape flaring outwardly from the leader pin.

4. The single-reel tape cartridge as claimed in any one of claims 1 to 3, wherein each of the first and second hooking arms has an entry guide face defined therein so as to face in a direction away from the magnetic tape and also has a hooking groove defined in a free end portion of the respective hooking arm so as to extend in a direction generally lengthwise of the corresponding hooking arm while opening laterally towards the leader pin by way of the entry guide face and also towards the other hooking arm.

5. The single-reel tape cartridge as claimed in claim 1, further comprising a releasable lock mechanism for holding the leader member firmly in a retracted position inside the cartridge housing when the tape cartridge is not in use, said releasable lock mechanism including a pair of first lock members and a second lock member cooperable with each other to lock the leader member at the retracted position at which the leader member is housed within the cartridge housing and positioned adjacent the tape window, and a spring element for urging the second lock member towards a locking position; and wherein the first lock members are formed in top and bottom panels of the cartridge housing adjacent the tape window for receiving the leader member at the retracted position in a predetermined posture and wherein the second lock member is positioned within the cartridge housing adjacent the tape window and comprises an elongated lock body reciprocatingly displaceably supported by the cartridge housing for movement between locking and release positions, and a biasing spring housed within the cartridge housing for urging the elongated lock body towards the locking position, said second lock member when held at the locking position cooperating with the first lock members to lock the leader member at the retracted position.

6. The single-reel tape cartridge as claimed in claim 1, wherein the leader pin has at least one radial step formed therein for avoiding a displacement of the leader tape relative to the leader pin in a direction axially thereof and wherein the second end of the magnetic tape is looped around the leader pin with at least one of opposite side edges of the leader tape held in abutment with the radial step to thereby position the leader tape with respect to the direction axially of the leader pin.

7. The single-reel tape cartridge as claimed in claim 6, wherein the leader tape is made of a hard tape having an elasticity.

8. The single-reel tape cartridge as claimed in claim 6, wherein the leader pin has a round sectional shape and also has a large diameter portion defined at a location axially intermediate of a length of the leader pin, end portions of the leader pin on respective sides of the large diameter portion having a diameter smaller than that of the large diameter portion and each of the end portions, and wherein the second end of the leader tape has a cut-out defined therein so as to extend inwardly thereof to thereby leave two tape end segments, said two tape end segments being looped around the respective end portions of the leader pin with one of opposite side edges of the tape end segments held in abutment with the adjacent radial step.

9. The single-reel tape cartridge as claimed in claim 6, wherein the leader pin has a reduced diameter portion defined at a location axially intermediate of a length of the leader pin, end portions of the leader pin on respective sides of the reduced diameter portion having a diameter greater than that of the reduced diameter portion with the radial step consequently defined between the large diameter portion and each of the end portions, and wherein the second end of the leader tape is looped around the reduced diameter portion of the leader pin with its opposite side edges held in abutment with the radial steps.

10. The single-reel tape cartridge as claimed in claim 6, wherein the radial step has a size equal to or greater than half the thickness of the leader tape.

* * * * *